United States Patent [19]
Fitzpatrick et al.

[11] Patent Number: 5,406,640
[45] Date of Patent: Apr. 11, 1995

[54] METHOD OF AND APPARATUS FOR PRODUCING PREDOMINATE AND NON-PREDOMINATE COLOR CODED CHARACTERS FOR OPTICAL CHARACTER RECOGNITION

[75] Inventors: Greg Fitzpatrick, Irving; William J. Johnson, Flower Mound; Robert S. Keller, Grapevine; Marvin L. Williams, Lewisville, all of Tex.

[73] Assignee: International Business Machines Corporation, Armonk, N.Y.

[21] Appl. No.: 812,178

[22] Filed: Dec. 20, 1991

[51] Int. Cl.[6] .............................................. G06K 9/18
[52] U.S. Cl. ........................................ 382/11; 101/211; 382/17; 395/110; 395/150
[58] Field of Search ............... 382/17, 11; 101/211; 395/109, 110, 117, 131, 150; 283/114, 901; 235/469; 358/79; 380/54

[56] References Cited

U.S. PATENT DOCUMENTS

| | | | |
|---|---|---|---|
| 3,938,088 | 2/1976 | Clark | 382/17 |
| 3,990,043 | 11/1976 | Clark | 382/17 |
| 4,009,466 | 2/1977 | Clark | 235/469 |
| 4,829,568 | 5/1989 | Clark et al. | 380/23 |
| 4,831,657 | 5/1989 | Casey et al. | 382/39 |
| 5,103,303 | 4/1992 | Shoji et al. | 358/75 |
| 5,153,739 | 10/1992 | Lamon et al. | 358/75 |

*Primary Examiner*—Joseph Mancuso
*Attorney, Agent, or Firm*—P. W. Johnson; Geoffrey A. Mantooth

[57] ABSTRACT

Color coding of characters both for optical character recognition by a machine and for viewing by a human is provided by coloring a character with a predominate color distinguishable by humans and a non-predominate color non-distracting to humans, but distinguishable by a color scanner. The advantage of the present invention is higher optical character recognition accuracy rates without the severe visual distraction to human readers of prior art color coded characters. A further technical advantage is that the invention can be practiced with conventional color printers and color scanners instead of the specialized apparatus of prior art color coded characters.

4 Claims, 4 Drawing Sheets

METHOD OF AND APPARATUS FOR PRODUCING PREDOMINATE AND NON-PREDOMINATE COLOR CODED CHARACTERS FOR OPTICAL CHARACTER RECOGNITION

CROSS REFERENCES TO RELATED APPLICATIONS

This application is related in subject matter to the following applications filed concurrently herewith and assigned to a common assignee:

Application Ser. No. 07/812,179, filed by G. P. Fitzpatrick entitled "Method of and Apparatus for Recognizing Predominate and Non-predominate Color Coded Characters for Optical Character Recognition" (IBM Docket DA9-91-090).

Application Ser. No. 07/812,249, filed by G. P. Fitzpatrick entitled "Method of and Apparatus for Optical Character Recognition Based on Geometric and Color Attribute Hypothesis Testing" (IBM Docket DA9-91-066).

The foregoing copending applications are incorporated herein by reference.

TECHNICAL FIELD OF THE INVENTION

This invention relates in general to optical character recognition, and in particular to a method of, and apparatus for, providing predominate and non-predominate color coded characters for optical character recognition.

BACKGROUND OF THE INVENTION

The printing of characters for subsequent optical character recognition (OCR) falls into two major categories which depend on the type of OCR technique which may be used. The first OCR technique is geometric OCR. The second OCR technique is color coded OCR.

Geometric OCR attempts to recognize a character based on the character's shape or the geometric representation of a set of pixels or dots. A character as used herein is meant to include a printed or written symbol which can be recognized by an OCR device or a human reader. The character can be an alphabetical symbol or an icon. Furthermore, the term pixel and dot will be used interchangeably to describe a distinguishable point recognizable by an OCR device. In such a geometric OCR approach, color is used only to define the shape of a character. Even if characters are represented by multiple colors, the multiple colors are converted to either black or a gray scale before shape analysis. Thus, the printing of characters for subsequent geometric OCR is primarily dependent on the shape of such characters as recognized by an OCR device or as perceived by a human reader.

Such a geometric OCR approach can provide a recognition accuracy as high as 99.5%. However, higher degrees of accuracy are desired. In addition, significant data storage is required for each character shape to be recognized. This means that a geometric representation of the shape of each character of the alphabet plus the other symbols to be recognized has to be stored. This data storage is redundantly duplicated for each character font supported. This means that not just one representation of the geometric shape is stored for the character "a", but that representations of the geometric shape for Prestige, Elite, Gothic, Roman, etc. versions of the character "a" are stored. Furthermore, computer processing time is required to compare to all of the stored shapes. Again from a redundancy standpoint, redundant computer processing time is required to compare to multiple fonts.

The second technique of color coded OCR attempts to recognize a character based on the character's color. In such an approach, color is used not only to indicate the shape of a character, but also to indicate the identity of the character. For example, "a" is printed red, "b" is printed blue, and "c" is printed yellow. Thus, the printing of characters for subsequent color coded OCR is dependent on both the shape of such characters as perceived by a human reader, and the color of such characters as recognized by an OCR device.

Color coding OCR eliminates the data storage and computer processing requirements of geometric OCR by eliminating shape processing. Color coding OCR also can provide higher recognition accuracy rates than those of geometric OCR as it is not subject to shape processing errors. However, prior art color coded characters cause a severe visual distraction to a human reader because such prior art color coding is distinguishable to a human reader. In addition, special OCR printing apparatus and special OCR reading apparatus are used for prior art color coded characters.

The two prior art approaches of representing characters for subsequent OCR processing present four major difficulties. The first two difficulties are the substantial storage and substantial computer processing required by geometric OCR shape processing. If these shape processing difficulties are avoided by using prior art color coded OCR, then the third difficulty is the severe visual distraction of prior art color coded characters to a human reader. A fourth difficulty is the special printing and reading devices used by prior art color coded OCR.

Thus, there is a need for an approach which can substantially increase the accuracy rate of optical character recognition techniques while overcoming the deficiencies of both prior art approaches.

SUMMARY OF THE INVENTION

With the proliferation of color scanners and color printers and the wide variety of optical devices which are color sensitive, a new approach can be applied to represent characters for OCR processing. The invention disclosed herein comprises a method of, and apparatus for, utilizing the color attributes of a character to represent a character.

In accordance with one aspect of the present invention, a color coded character for optical character recognition is provided comprising a predominate color associated with the character distinguishable by humans, and a non-predominate color associated with the character and not distracting to humans, but distinguishable by a color scanner. The non-predominate color need only be distinguishable by a color scanner, color OCR device, or color OCR program and need not be distinguishable by human perception. Such characteristics allow the character to be perceived by a human reader as the single predominate color. The amount of interlaced non-predominate color and the combinations of such colors within a character may be used to determine the identity of the character being represented. Thus, the present invention allows the non-predominate color of a character to be used as the sole criteria for recognizing the character. The technique of using a non-predominate color as an attribute for recognizing the character may be applied to as many characters as there are non-predominate colors which are recognizable by the color scanner, color OCR device, or color OCR program. Furthermore, the technique of using combinations of non-predominate colors may be applied to as many characters as there are non-predominate color combinations.

Another aspect of the present invention is to provide such a color coded character wherein the non-predominate color further comprises a pixel of the non-predominate color, wherein the pixel of the non-predominate color is interlaced with a plurality of pixels of the predominate color.

Yet another aspect of the present invention is to provide a method of, and an apparatus for, producing such color coded characters.

The present invention has the technical advantage of providing higher optical character recognition accuracy rates. The present invention has the further advantage of reducing the amount of storage required for OCR. The present invention has the still further advantage of reducing the amount of computer processing required for OCR. The present invention has the still further advantage of removing the severe visual distraction to a human reader of prior art color coded OCR. The present invention has the still further advantage of having no requirement for special printing or OCR reading devices.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Referring first to FIG. 1 through FIG. 4, examples of prior art characters for optical character recognition are shown.

Figure 1:
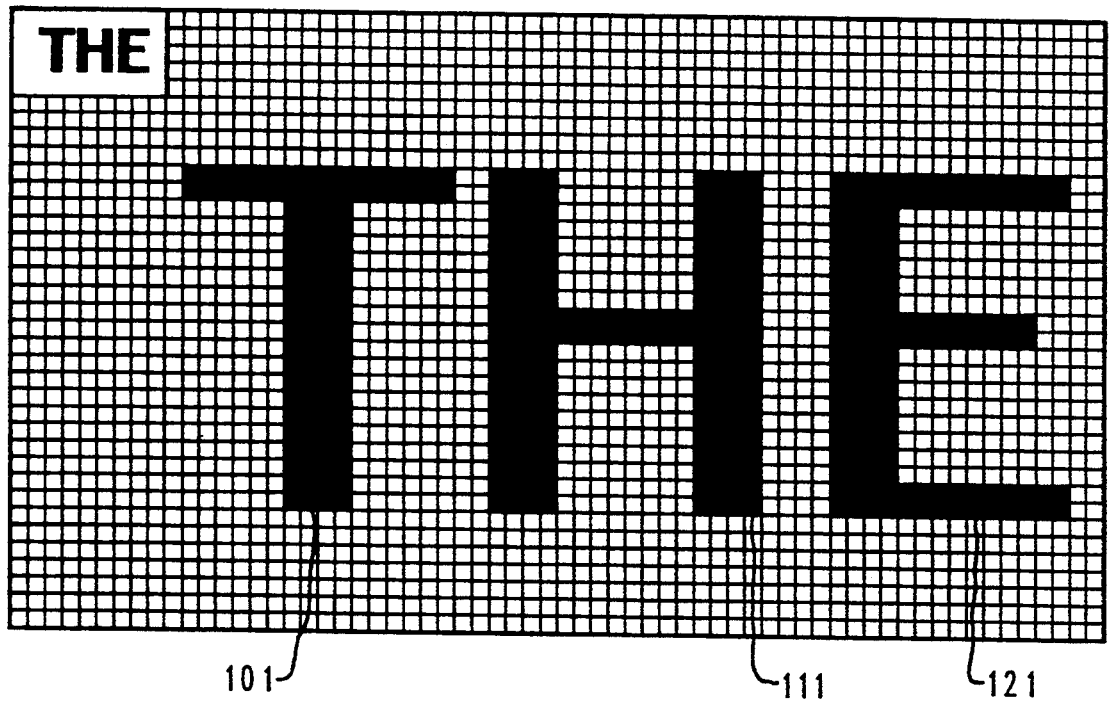
FIG. 1 illustrates a prior art gray scale technique of representing characters primarily used in the geometric optical character recognition arts.

FIG. 1 shows a prior art gray scale technique of representing the word "THE" composed of the three characters "T" 101, "H" 111, and "E" 121. In the gray scale technique, all characters are represented by a single color, usually black. This is the technique most commonly used for representing characters to be processed by geometric OCR.

Figure 2:
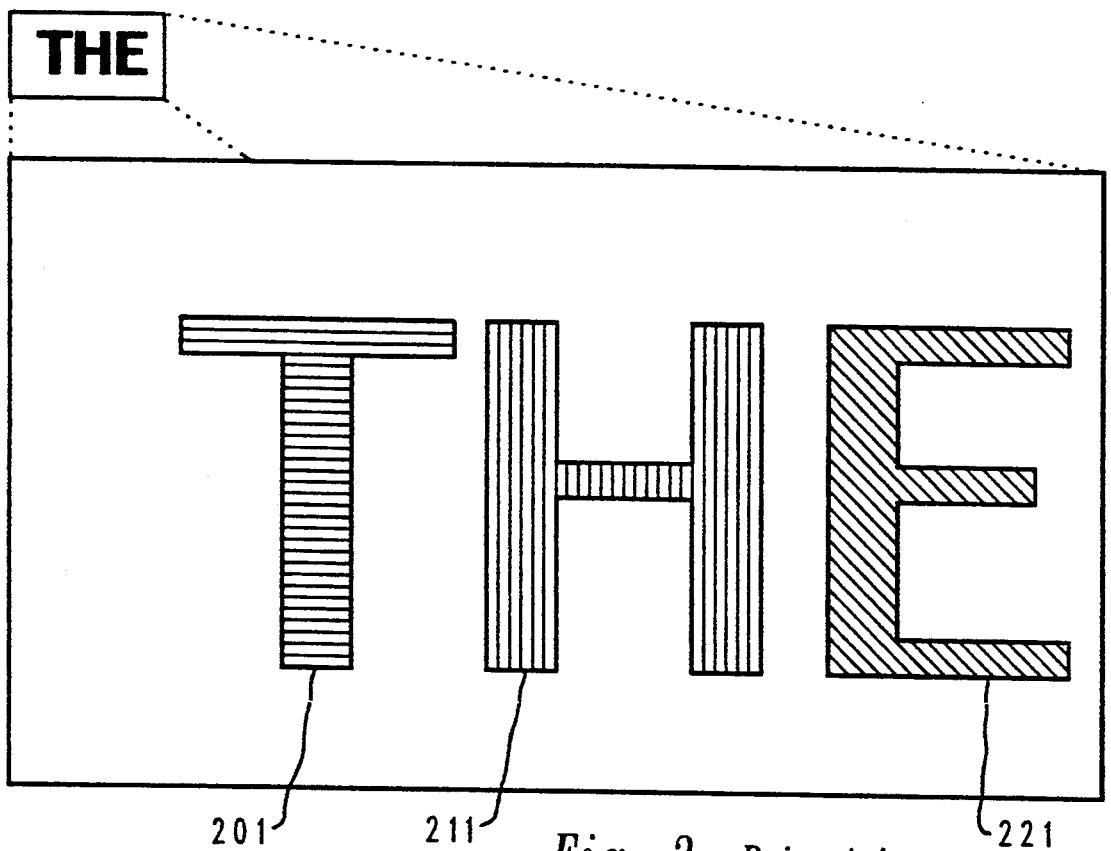
FIG. 2 illustrates a first prior art color coded technique of representing characters.

Referring next to FIG. 2, a first prior art color coded technique of representing the word "THE" composed of the three characters "T" 201, "H" 211, and "E" 221 is shown. In this first color coded technique, each character is represented by a different color. For example, the character "T" 201 is blue. The character "H" 211 is red. The character "E" 221 is green.

Figure 3:
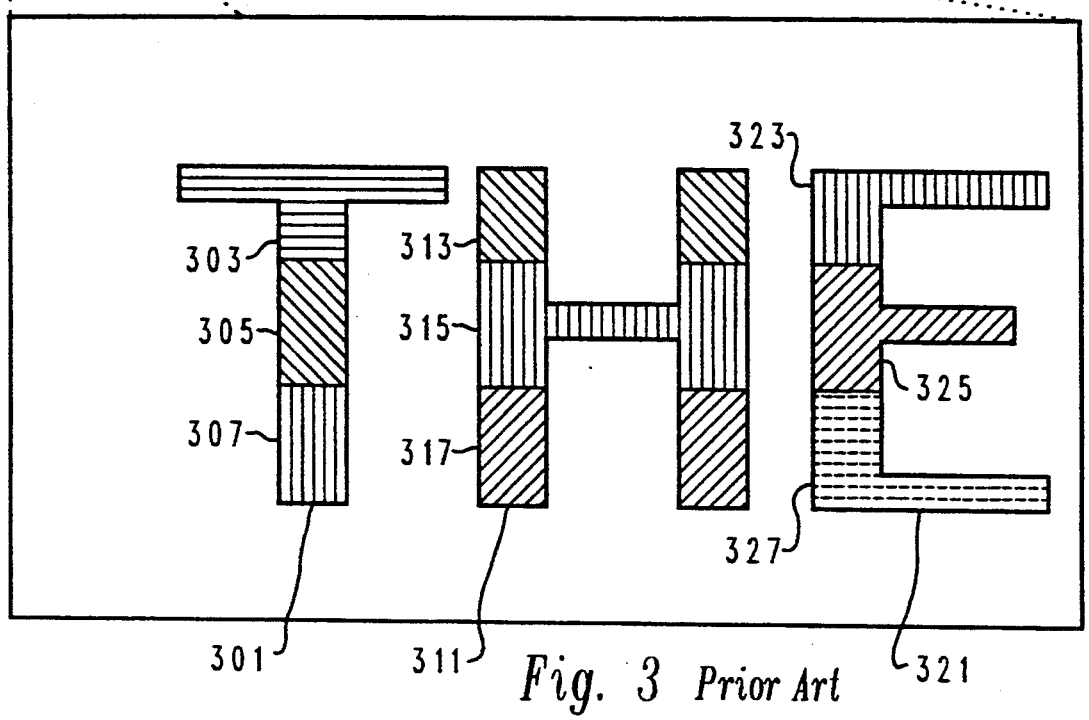
FIG. 3 illustrates a second prior art color coded technique of representing characters.

Referring next to FIG. 3, a second prior art color coded technique of representing the word "THE" composed of the three characters "T" 301, "H" 311, and "E" 321 is shown. In this second color coded technique, each character is represented by a different plurality of strips of color, each such strip being a different color from the adjacent strips. For example, the character "T" 301 is composed of three strips with the top strip 303 being blue, the middle strip 305 being green, and the bottom strip 307 being red. The character "H" 311 is composed of three strips with the top strip 313 being green, the middle strip 315 being red, and the bottom strip 317 being brown. The character "E" 321 is composed of three strips with the top strip 323 being red, the middle strip 325 being brown, and the bottom strip 327 being gray.

Figure 4:
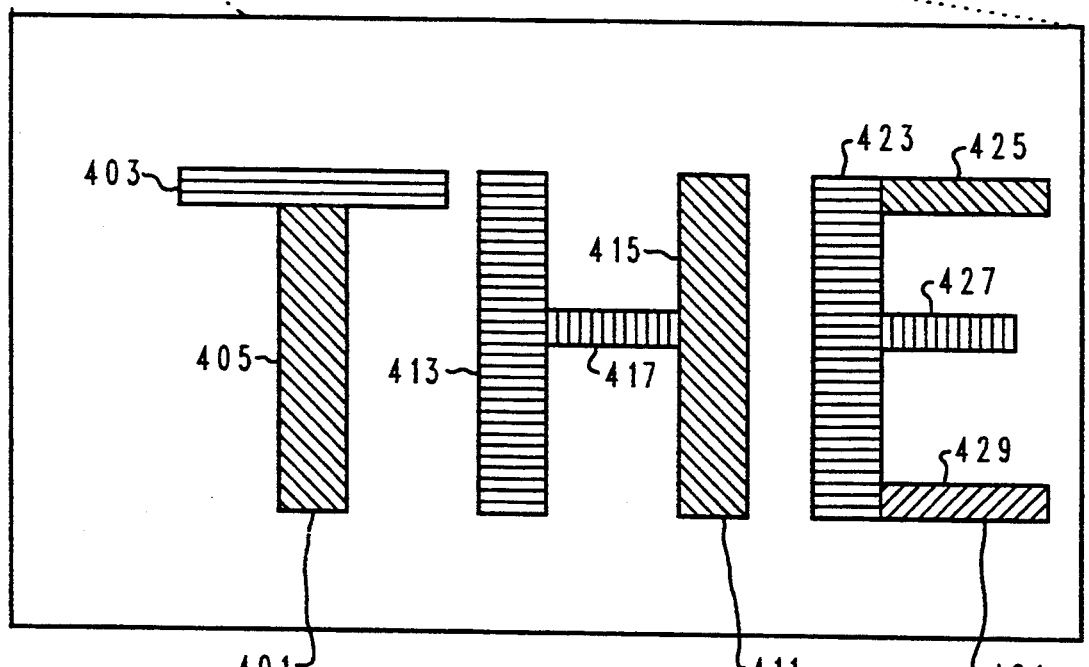
FIG. 4 illustrates a third prior art color coded technique of representing characters.

Referring next to FIG. 4, a third prior art color coded technique of representing the word "THE" composed of the three characters "T" 401, "H" 411, and "E" 421 is shown. In this third color coded technique, each stroke within a character is represented by a different color. For example, the character "T" 401 is composed of two strokes: a horizontal stroke 403 and a vertical stroke 405. The horizontal stroke 403 is blue, and the vertical stroke 405 is green. The character "H" 411 is composed of three strokes: a first vertical stroke 413, a second vertical stroke 415, and a horizontal stroke 417. The first vertical stroke 413 is blue, the second vertical stroke 415 is green, and the horizontal stroke 417 is red. The character "E" 421 is composed of four strokes: a vertical stroke 423, a first horizontal stroke 425, a second horizontal stroke 427, and a third horizontal stroke 429. The vertical stroke 423 is blue, the first horizontal stroke 425 is green, the second horizontal stroke 427 is red, and the third horizontal stroke 429 is brown.

FIGS. 2, 3, and 4 of the prior art approaches to color coded characters for optical character recognition in conjunction with the descriptions thereof clearly demonstrate the deficiency of the severe visual distraction to a human reader of distinguishable color coding.

Figure 5:
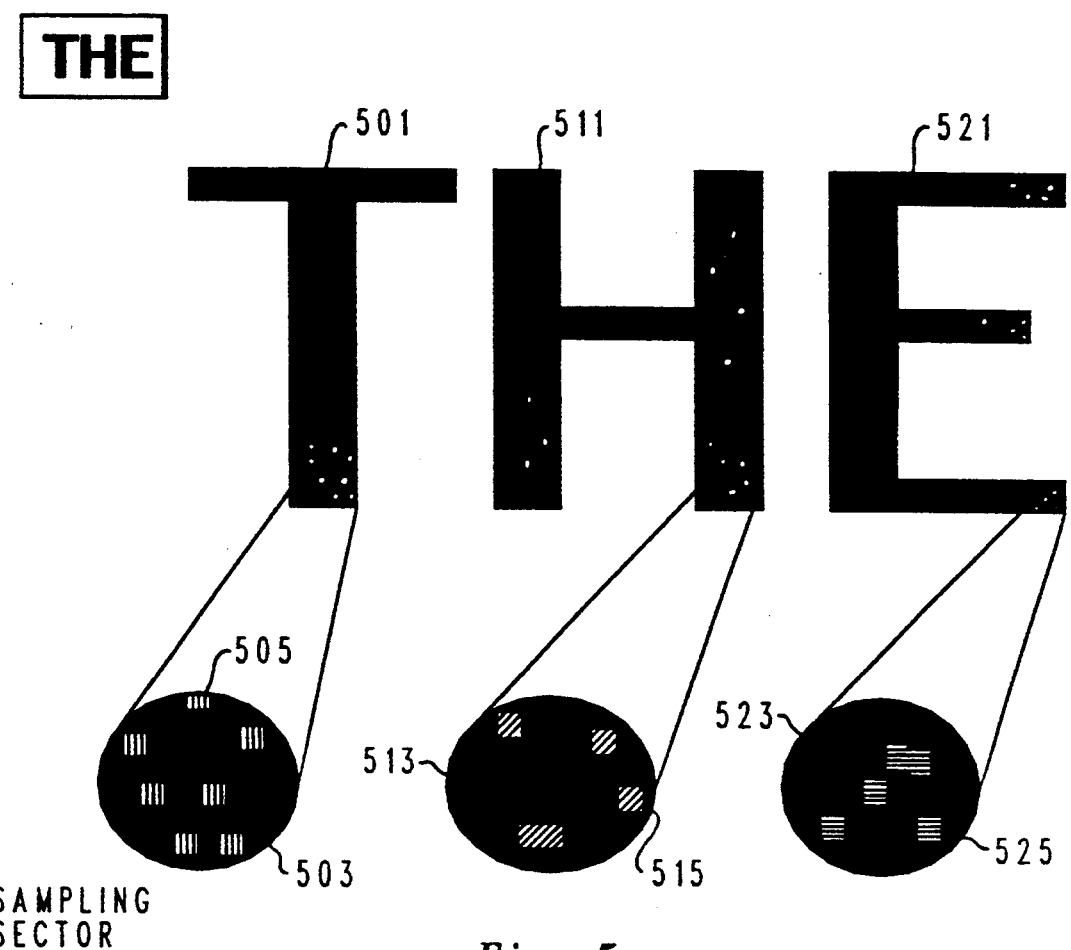
FIG. 5 illustrates a color coded technique of representing characters in accordance with the present invention.

Referring next to FIG. 5, a representation of the word "THE" composed of the three characters "T" 501, "H" 511, and "E" 521 in accordance with the present invention is shown. In this predominate and nonpredominate color coded technique, each character is represented by a predominate color associated with the character and a non-predominate color associated with the character. The predominate color is readily distinguishable by humans. The non-predominate color is associated, interlaced, intermingled, or embedded with the predominate color. The non-predominate color is not distracting to humans, but distinguishable by a color scanner. For example, the bodies of the characters "T" 501, "H" 511, and "E" 521 are all composed of a predominate color black. The black predominate color is distinguishable by a human reader, and the characters appear black to a human reader. The exploded view 503 of a portion of the body of the character "T" 501 illustrates a non-predominate color 505 which may comprise red associated with the character "T" 501. The non-predominate color 505 is not distracting to humans, but distinguishable by a color scanner. The non-predominate color 505 is also associated, interlaced, intermingled, or embedded with the predominate color black. The exploded view 513 of a portion of the body of the character "H" 511 illustrates a non-predominate color 515 which may comprise brown associated with the character "H" 511. The non-predominate color 515 is not distracting to humans, but distinguishable by a color scanner. The non-predominate color 515 is also associated, interlaced, intermingled, or embedded with the predominate color black. The exploded view 523 of a portion of the body of the character "E" 521 illustrates a non-predominate color 525 which may comprise blue associated with the character "E" 521. The non-predominate color 525 is not distracting to humans, but distinguishable by a color scanner. The non-predominate color 525 is also associated, interlaced, intermingled, or embedded with the predominate color black.

Figure 6:
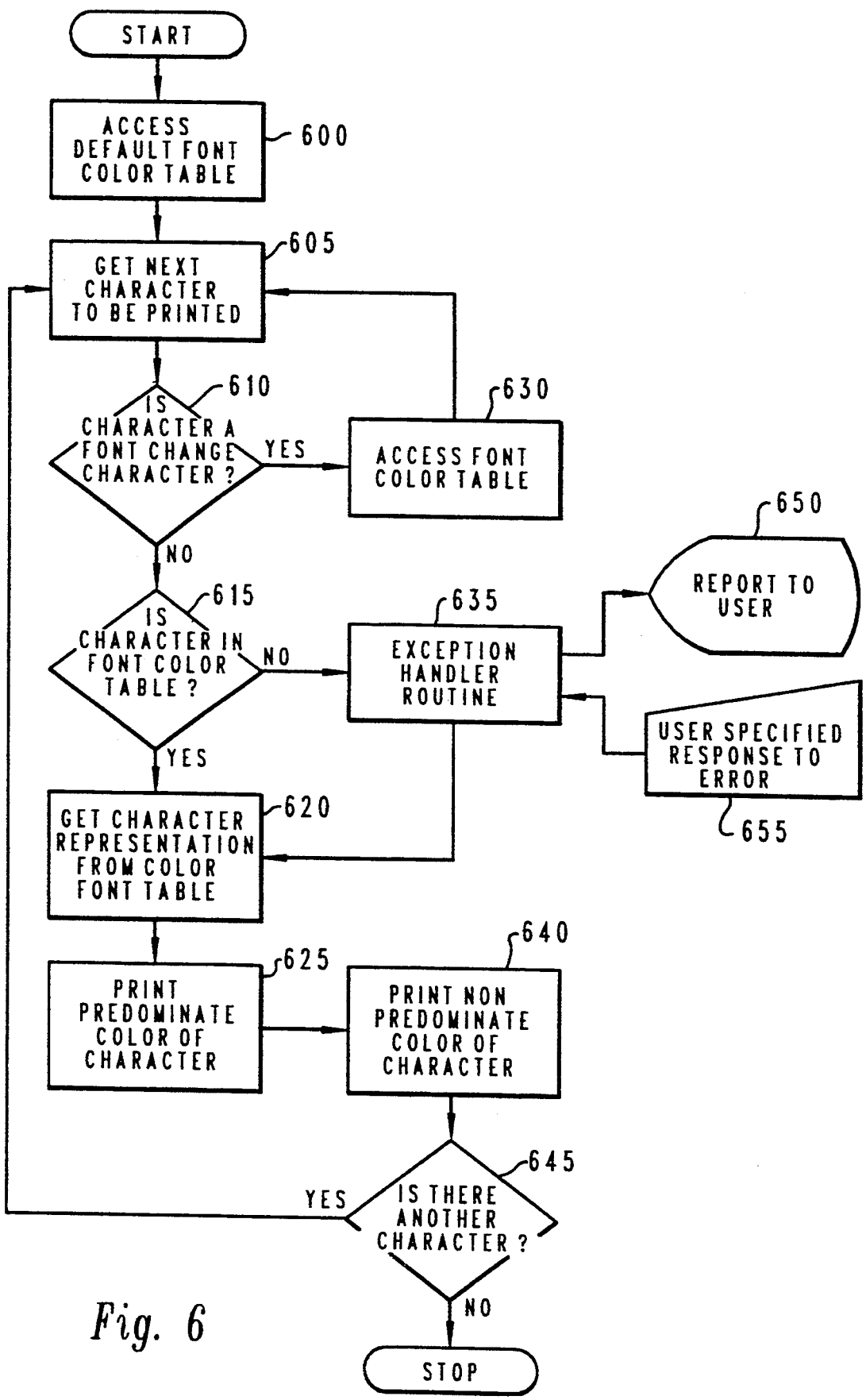
FIG. 6 is a flow chart illustrating the operations preferred in carrying out the present invention.

Referring next to FIG. 6, a flowchart illustrating operations preferred in carrying out the present invention is shown. In the flowchart, the graphical conventions of a diamond for a test or decision and a rectangle for a process or function are used. These conventions are well understood by those skilled in the art, and the flowchart is sufficient to enable one of ordinary skill to write code in any suitable computer programming language. As shown in FIG. 6, after the start of the program, process block 600 accesses a default font color table. The default font color table contains a representation of each character supported within the default font. Each such character representation comprises a predominate color associated with the character distinguishable by humans, and a non-predominate color associated with the character and not distracting to humans, but distinguishable by a color scanner, similar to the representations illustrated in FIG. 5.

Thereafter, process block 605 gets a character to be printed. Decision block 610 is used to determine whether or not the character is a font change character. A font change character is a control character that selects and makes effective a change in the specific shape, or size, or shape and size, of the graphic representations of a character set. If the character is not a font change character, then decision block 615 determines whether or not the character is represented within the font color table. If the character is represented within the font color table, then process block 620 gets from the font color table a representation of the character comprising a predominate color associated with the character distinguishable by humans, and a non-predominate color associated with the character and not distracting to humans, but distinguishable by a color scanner. Thereafter, process block 625 prints the predominate color associated with the character distinguishable by humans. Thereafter, process block 640 prints the non-predominate color associated with the character. Thereafter, decision block 645 is used to determine whether or not there is another character to be printed. If there is not another character to be printed, then the program stops.

Returning now to decision block 645, if there is another character to be printed, the program returns to process block 605 for further processing of the character.

Returning now to decision block 615, if the character is not represented within the font color table, then process block 635, which is an exception handler routine, processes the exception. A default action of process block 635 is to substitute a substitution character supported by the color font table for the character which is not supported by the color font table. Process block 635 also reports the exception to a user through an output device 650. In lieu of the default action, process block 635 may execute a user specified response to the exception, such as an alternative substitution character, as specified by the user through an input device 655. Thereafter, the program returns to process block 620 for further processing of the substitution character.

Returning now to decision block 610, if the character is a font change character, then process block 630 accesses a font color table as specified by the font change character. Thereafter, the program returns to process block 605 for further processing of a next character after the font change character.

Figure 7:
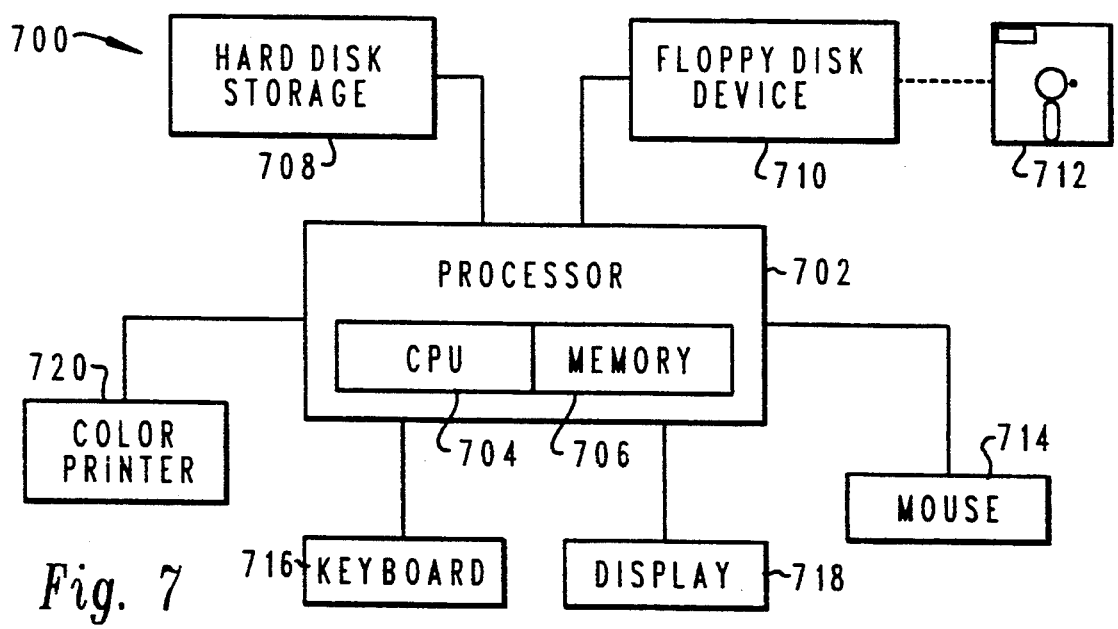
FIG. 7 is a block diagram of a computer system used in performing the method of the present invention and forming part of the apparatus of the present invention.

Referring now to FIG. 7, there is shown in block diagram form, a data processing system 700 according to the present invention. The data processing system 700 includes a processor 702, which includes a central processing unit (CPU) 704, and a memory 706. Additional memory, in the form of a hard disk file storage 708 and a floppy disk device 710, is connected to the processor 702. Floppy disk device 710 receives a diskette 712 which has computer program code recorded thereon that implements the present invention in the data processing system 700. The data processing system 700 includes user interface hardware, including a mouse 714 and a keyboard 716 for allowing user input to the processor 702 and a display 718 for presenting visual data to the user. The data processing system also includes a color printer 720.

Although the present invention has been particularly shown and described with reference to a preferred embodiment, it will be understood of those skilled in the art that various changes in form and detail may be made without departing from the spirit and the scope of the invention.

What is claimed is:

1. A set of color coded characters for optical character recognition, comprising:
   a first character and a second character;
   each of said first and second characters having unique geometric shapes formed by a first color, said first character geometric shape being different than said second character geometric shape so as to define said first character relative to said second character when visually identified by a human;
   one or more pixels of a second color located in said first character geometric shape, said second color pixels being distinguishable by a color scanner; and
   one or more pixels of a third color located in said second character geometric shape, said third color being different from said second color, said third color pixels being distinguishable by said color scanner.

2. A method of creating a set of color coded characters for optical character recognition, comprising the steps of:
   creating a first character by creating a first geometric shape of a first color;
   locating one or more pixels of a second color in said first character first geometric shape, said second color pixels being distinguishable by a color scanner;
   creating a second character by creating a second geometric shape of said first color, said first geometric shape being different from said second geometric shape so as to define said first character relative to said second character when visually identified by a human;

locating one or more pixels of a third color in said second character second geometric shape, said third color pixels being distinguishable by said color scanner.

3. The method of claim 2, wherein:

said steps of creating first and second geometric shapes of a first color further comprise the steps of printing plural pixels of said first color in said first and second geometric shapes;

said step of locating one or more pixels of a second color in said first geometric shape further comprises the step of printing said pixels of said second color in said first geometric shape; and said step of locating one or more pixels of a third color in said second geometric shape further comprises the step of printing said pixels of said third color in a second geometric shape.

4. An apparatus for creating a set of color coded characters for optical character recognition, comprising:

means for creating a first character by creating a first geometric shape of a first color;

means for locating one or more pixels of a second color in said first character first geometric shape, said second color pixels being distinguishable by a color scanner;

means for creating a second character by creating a second geometric shape of said first color, said first geometric shape being different from said second geometric shape so as to define said first character relative to said second character when visually identified by a human;

means for locating one or more pixels of a third color in said second character second geometric shape, said third color pixels being distinguishable by said color scanner.

* * * * *